March 26, 1963     C. E. KLEIBER     3,083,082
FLUIDIZED SOLIDS RECOVERY SYSTEM
Filed Dec. 19, 1957
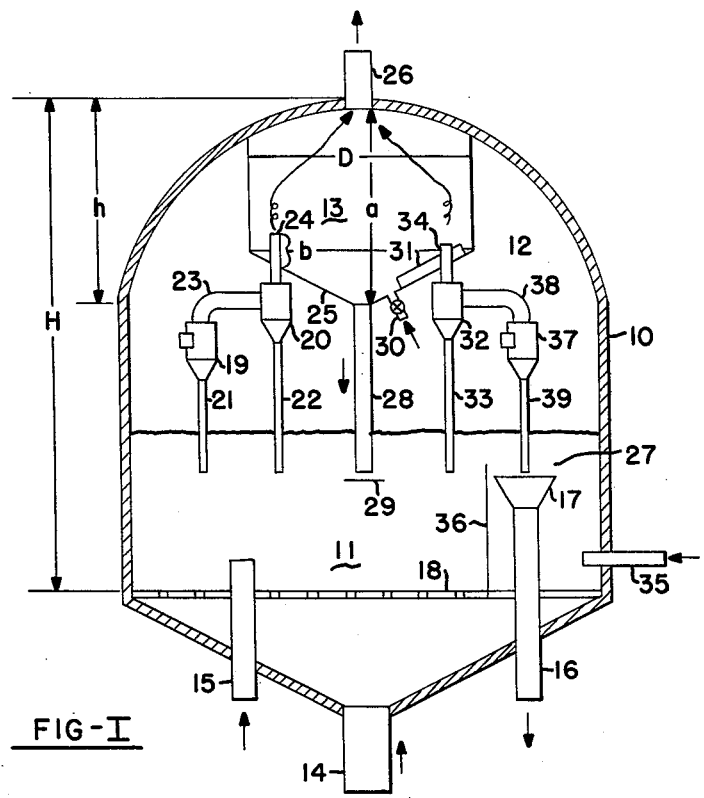
FIG-I
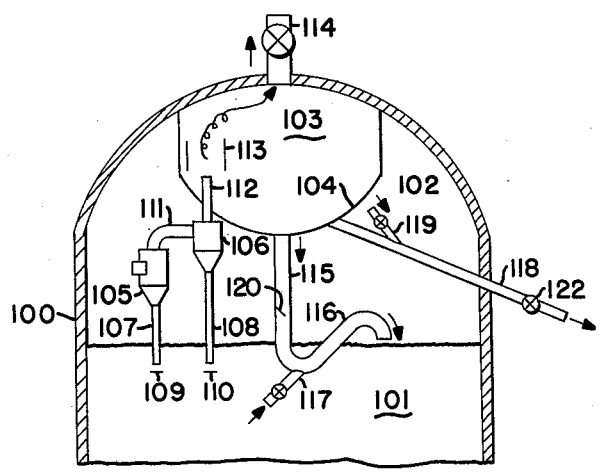
FIG.-II
Carl E. Kleiber     Inventor
By     Attorney United States Patent Office 3,083,082
Patented Mar. 26, 1963

3,083,082
FLUIDIZED SOLIDS RECOVERY SYSTEM
Carl E. Kleiber, Chester Township, Morris County, N.J., assignor to Esso Research and Engineering Company, a corporation of Delaware
Filed Dec. 19, 1957, Ser. No. 703,918
1 Claim. (Cl. 23—284)

The present invention is concerned with the more effective recovery of fine solids entrained in upflowing gases. More particularly, it deals with apparatus and process conditions for recovering solids normally discharged from the gas outlets of cyclonic separators operating in the upper portion of a fluidized solids gas-solids contacting zone.

In recent years, fluidized solids techniques have assumed increasing popularity in the petroleum and other allied process industry. As is well known, the highly turbulent nature of the solids bed generally employed ensures excellent mixing of solids, good gas-solids contact, and highly uniform temperature levels throughout the fluidized bed.

In brief compass, a conventional fluidized solids operation, as for example fluid catalytic cracking, comprises injecting a volatilizable feed material into a mass of fine particles maintained in a characteristic pseudo-liquid state. After a certain residence interval in the fluid bed, gases, along with entrained fine solids, flow upwardly into the dilute phase region of the gas-solids contacting chamber, wherein they are subjected to the action of one or more separation units, e.g. cyclones or the like. Collected separated fines are normally returned to the solids bed via diplegs which are appended on the cyclone units, and are a standard facility of this type of gas-solids separating equipment, while thus treated gases are withdrawn overhead.

It has, heretofore, been standard practice in many such gas-solids contacting vessels, to flow separated vapors into an enlarged gas collection zone, or plenum chamber, whencefrom the gases are then generally discharged to the atmosphere or passed to other processing facilities or equipment. Since normally a plurality of separators or cyclones are used, each having a relatively small gas exit conduit when compared with the diameter of the vessel, the plenum chamber serves as a manifold for collecting the discharge of the several lines, and acts to take up minor pressure surges in the overhead system. Moreover, this enlarged gas collecting zone tends to compensate for thermal expansion of the parts and attachments in the upper confines of the vessel, and is of considerably cheaper construction for effecting discharging of gases than would be required if the cyclone outlet lines were individually passed through the top of the contacting vessel shell.

However, among the disadvantages of fluidized solids system is the rather large losses of the very fine particles, e.g. 40 microns and smaller, in the overhead or stack gases. In order to maintain proper bed fluidity, an appreciable proportion of the bed solids must be of the size range of fine particles. Their loss due to entrainment necessitates considerable effort in replacing them in the fluidized bed. Most importantly, in catalytic cracking, fluid hydroforming and other systems employing relatively expensive contacting solids this carryover of fines in overhead gases results in solids losses and decreased plant processing efficiency amounting to hundreds of thousands of dollars per commercial unit. Additionally, the discharge of entrained fines into the atmosphere has tended to add to atmospheric pollution. Expensive equipment, such as Cottrell precipitators, scrubbing facilities etc. may well be required in order to operate within municipal regulations.

As was briefly described, conventional systems have employed pluralities of cyclones, e.g. 2 to 12 units or more in parallel and/or in series, in an effort to reduce such losses to a minimum. While these separation units have a fair degree of efficiency in solid fines collection under ideally designed and perfectly smooth conditions within the contacting chamber, such conditions are the exception rather than the rule. System surges associated with instrumentation problems as well as the usual operating upsets in fluidized solids conditions, along with erosion and damage to the cyclones themselves, detrimentally affect the solids recovery efficiency. These upsets have resulted in increased carryover of solids into the plenum chamber and ultimate loss from the system.

In accordance with the present invention, solids losses due to surging and the less than perfect efficiency of any separation system may be further reduced. More particularly, the present system contemplates adapting the conventional plenum chamber to serve as an additional solids recovery stage by supplying means for withdrawing fine solids de-entrained in the relatively large volume of the plenum chamber. In specific aspects, a conduit is provided for returning fines to the fluid bed, or for withdrawing separated fines from the plenum chamber and recovering them as such. Heretofore, entrained solids settling out in the plenum chamber due to its increased area and the swirling actions of the vapor discharge have merely increased in amount until the solids are re-entrained and carried out of the vessel by the upflowing vapor stream. By practice of the present invention, these fine solids are recovered, and a considerable solids recovery credit added to the gas-solids separation system. Existing structures may be thus modified to secure additional benefits above and beyond that contemplated at the time of their initial construction.

While the present invention is particularly desirable in fluidized solids operation e.g. catalytic cracking, fluid hydroforming, fluid coking, fluid bed regenerators, combustion zones, coal gasification and carbonization units, etc., it may be employed in various other gas-solids systems having a plenum chamber of the character described.

It should be clearly understood that the terms "plenum chamber," "gas collecting zone," "terminal area" etc. are to be interpreted as connoting the enlarged chamber or area employed in gas-solids contacting systems, to which the conventional solids separators (cyclone, etc.) discharge, and whencefrom thus separated gases are withdrawn from the system.

The terms "vapors" and "gases" are to be understood as being used interchangeably.

The various aspects of the present invention will be made more clearly apparent by reference to the following description, example and accompanying drawings.

FIG. I illustrates a fluidized solids catalytic reaction zone operating in accordance with the present invention.

FIG. II depicts the upper part of solids-gas contactor having a particularly flexible plenum chamber design and operation.

Turning to FIGURE I, there is shown, for the purposes of describing the present invention, catalytic reactor 10 having a fluidized mass 11 of catalytic particles therein. As has previously been brought out, the present invention has broad application and is not necessarily limited to fluidized catalytic conversions. However, the value of the catalyst fines, both as measured in dollars and operability of the fluid bed, makes the present invention particularly desirable to fluidized catalytic cracking and hydroforming.

While the catalytic reactor, per se, does not constitute an essential part of this invention, a brief description of it will be given for the purpose of completeness.

Fluid bed 11 is supported on grid 18 or other well known supporting means, and is maintained in fluid state by means of volatilizable feed oil material and steam, with or without entrained solids therein, flowing upwardly through line 14 into reactor 10. The catalytic particles are any conventional catalyst, e.g. silica-alumina mixture, and are less than 1000 microns in size. They preferably range from 0–150 microns in size, the major portion of the solids ranging between 20 to 80 microns in diameter. The reaction bed is maintained at a temperature of about 900–1200° F. by means of hot regenerated solids introduced thereto through line 15. One or more vertical partitions 36 divide the reactor 10 into a reaction and a stripping section. Generally, a portion of the bed particles are, after occluded hydrocarbons are stripped by steam introduced by line 35 into stripping zone 27 and by steam stripping in line 16, withdrawn by means of funnel opening 17, and passed through line 16 to a combustion zone, not shown. Oxidation therein of carbonaceous residue deposited during the course of the catalytic reaction serves to heat the particles to requisite temperatures, e.g. 50 to 200° F. above that of the reaction bed, for supplying thermal energy to the conversion step.

Gasiform material, i.e. steam, volatilized and cracked feed constituents, together with entrained fine solids generally somewhat smaller in particle size than the average sized particle of the fluidized dense bed catalyst pass upwardly from the fluid bed into dilute phase 12 thereabove. As shown, a plurality of separation units, e.g. cyclones 19 and 20 connected in series by conduit 23 and in parallel relationship with cyclones 32 and 37 similarly connected by conduit 38, serve to de-entrain the fine solids in accordance with standard separation practice, the separated solids being returned to the reaction bed by diplegs 21, 22, 33 and 39 respectively.

The thus treated gases are then passed into terminal area or plenum chamber 13 by exit conduits 24 and 34, the chamber serving as a gas collecting manifold whencefrom the gases are removed overhead through line 26. The gases are then normally sent to condensation, fractionation, subsequent processing, etc.

Up to this point, the above description has related to features well known in the art. In former practice, any solids separating in chamber 13 merely accumulated in its lower portion until they were re-entrained in upflowing gases and withdrawn overhead therewith.

According to the present invention, means are provided for effecting improved separation of solids in chamber 13 and for recovering de-entrained solids therefrom. While a conduit, not shown, may be provided for removing solids from vessel 10 and recovering them as a distinct fine solids mass, it is normally preferred to return the fines to the reaction bed itself by one or more diplegs 28. The solids thus recovered are generally less than 40 to 60 microns in diameter, normally of the order of 10 to 40 microns. In order to prevent vapors and catalyst flow directly from the reaction bed to plenum chamber 13, dipleg 28 is provided with a suitable seal arrangement, such as baffle plate 29, or a check valve, gas seal, flapper valve etc., not illustrated. Of course, numerous other conventional means may be employed for accomplishing this seal effect.

The plenum chamber of the present invention preferably has a tapered lower or floor portion 25 of a conical or downwardly concaved cross-section so as to aid settled out catalyst in flowing to dipleg 28. If desired, as for example when existing units are to be adapted for the present invention, various other shaped chambers, e.g. substantially flat bottomed or concaved upwards, may be readily utilized.

Often, the natural vibrations of the equipment within the fluid solids vessel during operations is sufficient to cause de-entrained fines to flow into and down plenum chamber dipleg 28. Aeration facilities, such as steam tap 30 and/or dipleg aeration may additionally be provided for aiding fine solids movement. Also, it may be advantageous to add relatively coarse solids to the gas collecting chamber as a means of promoting recovered solids flow into the dipleg. This may be conveniently done by means of a standpipe leading into the plenum chamber, coarse solids being supplied from the reaction bed, regenerator or elsewhere.

With regard to the specific de-entrainment process occurring in area 13, the plenum chamber is of considerably greater volume and cross-section than the exit line 24 and 34 of the separation units or the volume of the individual separation units and hence gases entering the chamber undergo a sizable reduction in velocity thus encouraging de-entrainment. Additionally, the swirling or rotating action of the vapors and entrained solids leaving the cyclone outlets as they enter the plenum chamber aid in vapor and gas separation. Separation is further improved by extension of the cyclone outlets above the wall 25 of the chamber, as is shown in the drawing. A quiescent zone is thus provided below the upper or terminal portions of the outlets, thereby minimizing commingling of upflowing vapors and de-entrained solids passing downwardly. As illustrated, the heights of the outlets are preferably placed at different levels so as to additionally minimize interference of vapors with solids settling. Furthermore, one or more thin plates or ribs 31 may be placed somewhat above the lowermost point of tapering section 25 and extending radially outward for a major portion of the tapering length of the plenum chamber so as to promote such quiescent or solids settling zones. In somewhat similar fashion, and as more fully described in regard to FIGURE II, the area immediately above the cyclone outlets may be baffled to prevent commingling of adjacent outlet vapors so as to aid in solids-gas separation in the plenum chamber zone.

By way of illustrating the practical advantages of the present invention, without separately removing fines from the plenum chamber as presently taught, the system illustrated has a solids separation efficiency of about 99.98%. By employing the present invention, overall solids recovery of better than 99.99% may be realized. When multiplied by the cost/unit of catalyst, direct catalyst savings of $100,000/year may thus be realized on an average sized plant of about 25,000 bbls./day capacity. However, there are other and additional benefits to be gained by this added solids fines recovery including improved gas-solids contacting efficiency and decreased atmospheric pollution.

Turning now to FIGURE II, there is depicted, for the purpose of illustrating the modifications of the present invention, the upper portion of regenerator or burner vessel 100. Within the vessel is a mass 101 of carbon-containing solids, e.g., coke particles from a fluid bed coking unit, undergoing combustion in the presence of oxygen-containing gas introduced thereto by means not shown. Disposed in the upper portion of vessel 100 are separator cyclones 105 and 106 connected by line 111. It should be understood the various other conventional separators, such as vanes, multicyclones, or the like, might be alternatively employed. Fine solids-carrying flue gas passes upwardly through the separators, through passageway 112 into terminal area 103 and thence out of the contacting vessel by means of withdrawal conduit 14.

Solids separated by the cyclones are generally returned directly to the combustion bed by diplegs 107 and 108.

Seal plates 109 and 110 prevent excessive backflow of gas-solids from the bed into the diplegs.

In the particular modification illustrated, the plenum chamber 103 has a hemispherically shaped lower floor portion 104 for facilitating downflow of solids into dipleg 115. Separated fine solids are caused to migrate (by vibrations, aeration, and/or gravity, etc.) to the lower portion of the chamber. In some cases, it is desirable to have a separate withdrawal line 118 having external valve 122 therein for removing fine, hot solids from the vessel. Thus, relatively coarse solids may be preferentially subjected to combustion while fines are recovered and used as such or otherwise withdrawn under controlled conditions and disposed of. Aeration taps 119 provide for smooth solids flow through line 118. Alternatively, dipleg 115 may have a branch line, not shown, for removal of recovered fines from the system.

When it is desirable to return fines to the bed, the solids are caused to flow down dipleg 115. This return conduit may advantageously have a J-bend configuration, the upwardly directed leg 116 serving as an added seal against solids-vapor flow from the reaction bed. The upper end of leg 116 preferably terminates with an 180° bend for returning fines to fluid bed 101. It is preferred to have leg 116 terminate at or somewhat above the level of the bed (as shown) so as to reduce the pressure resistance to fine particle flow. The rate of solids downflow through the dipleg is controlled by flapper valve 120. Aeration line 117 provides a rising gas flow in leg 116 to remove from the bottom of the dipleg 115 the collected solid fines for transport and return to dense bed 101 if there is insufficient solids outage from the plenum chamber. Line 117 may also act as a vapor sealing means.

Returning to the gas flow pattern, it is desirable to arrange the cyclone separators so as to establish clockwise or counterclockwise flow in the plenum chamber, thus incrementally providing solids de-entrainment therein. As shown, a relatively large, open-ended, cylindrical duct 113 is arranged above the upper end of outlet line 112 and fixed in concentric relationship with respect to cyclone outlet 112 as a means of minimizing commingling of upflowing gases and descending, or horizontally projected, de-entrained solids. Other baffle configurations for promoting quiescent zones and gas-solids separation, such as a diverging snout may be alternatively employed.

It becomes apparent that the present invention has broad applications and may be used wherever gas-solids separation units operate in conjunction with plenum chambers regardless of whether the separation units be internal or external of the principal reaction vessel. Further, it is applicable to dilute phase or transfer line operation and the like. It may be utilized in systems employing a single cyclone, one or more series of cyclones, a series of more than two cyclones, or simply two cyclones in parallel.

Solids de-entrainment in the gas collecting zone may be enhanced by various means well known to those skilled in the art. Additionally, while the drawings illustrate return of fines from the plenum chamber directly to the reaction or combustion bed, they may be circulated in numerous other patterns so as to make efficient use of the fine particles. Thus, they may be passed from the plenum chamber to any or all of the following areas: the solids inlet conduit to the reaction chamber, the stripping zone, or the oil injector. Alternatively, the fines may be passed from the plenum chamber of a regenerator directly to the conversion step or vice versa.

To further clarify the nature of the present invention, tabulated below is a specific example of the characteristic features of the system shown in FIGURE I, based on the fluid bed catalytic conversion of a hydrocarbon gas oil fraction boiling above 430° F. with an alumina-silica catalyst. Of course, the present invention is not limited to the specific numerical values recited.

Table I

| Process: | Example |
|---|---|
| Temperature of reaction bed, °F | 900 |
| Size range of major portion of bed solids, microns | 20–80 |
| Oil feed rate, gals./hr | 13,650 |
| Volumetric production rate of reactor vapors, std. cu. ft./hr | 1,567,000 |
| Reactor pressure, p.s.i.g | 15 |
| Average superficial velocity of vapors in cyclone outlets 24 and 34, ft./sec | 17.3 |
| Average velocity of vapors in plenum chamber 13, ft./sec | 2.07 |
| Quantity of fines recovered from plenum chamber, lbs./hr | 100 |

Table II

| Apparatus: | |
|---|---|
| Vessel height above grid plate (H), ft | 81.4 |
| Height of vessel top section (h), ft | 7.6 |
| Average diameter of vessel, ft | 14 |
| Total volume of terminal cyclones 20+32, cu. ft | 56.1 |
| Total volume of cyclone outlets 24+34, cu. ft. | 14.55 |
| Diameter of upper portion of plenum chamber (D), ft | 6.6 |
| Maximum height of plenum chamber (a), ft | 6.5 |
| Horizontal slope of tapering portion 25, ° | 45 |
| Volume of plenum chamber, cu. ft | 154 |
| Projecting height of cyclone outlet 24 (b), ft.[1] | 1.5 |
| Difference in projecting heights of outlets 24 and 34, ft | 0.15 |
| Length of rib 31, ft | 3.0 |
| Length of conduit 28, ft | 20 |

[1] While not illustrated in FIG. I, a cylindrical duct, 1.75 cu. ft. in volume and 1 ft. in height, may be placed 0.5 ft. above cyclone outlet 24 so as to minimize commingling of gasses and solids.

By way of summary, the present invention is concerned with the modification of conventional plenum chambers so as to provide an additional stage of solids recovery. The increased recovery of fine particles thus obtained reduces solids losses, and aids in maintenance of proper fluidized solids conditions. Fundamentally, the present invention teaches that means are provided for removing and recovering de-entrained solids from the plenum chamber. Numerous modifications may be made within the spirit of the above concept, and the present invention is to be interpreted, as broadly as the art permits, as reading thereon.

What is claimed is:

In an apparatus for contacting gases and finely divided solids including a vessel, gas-solids separation means arranged in the upper portion of said vessel, said gas-solids separation means including a plurality of sets of cyclone separators in parallel, each set of cyclone separators being in series, a gas collecting plenum chamber arranged in the upper portion of said vessel for collecting gas from said cyclone separators, the exit conduit from each of said cyclone separator sets emptying into said plenum chamber, said gas collecting plenum chamber being of greater volume than said gas solids separation means, a top outlet for gas on said gas collecting plenum chamber, a separate conduit extending down from said plenum chamber for downwardly removing fine solids from said plenum chamber, said exit conduits extending vertically up through the floor of and up into said plenum chamber to provide quiescent zones in said plenum chamber below the outlet portions of said exit conduits.

References Cited in the file of this patent

UNITED STATES PATENTS

| | | |
|---|---|---|
| 2,337,684 | Scheineman | Dec. 28, 1943 |
| 2,378,542 | Edmister | June 19, 1945 |
| 2,420,049 | Martin | May 6, 1947 |
| 2,654,242 | Matheson | Oct. 20, 1953 |
| 2,706,704 | Squires | Apr. 16, 1955 |
| 2,879,145 | Rice | Mar. 24, 1959 |
| 2,895,907 | Crosby | July 21, 1959 |